(12) United States Patent
Beewen

(10) Patent No.: US 9,181,031 B2
(45) Date of Patent: Nov. 10, 2015

(54) TROLLEY AS WELL AS A STORAGE SYSTEM COMPRISING SUCH A TROLLEY

(71) Applicant: VANDERLANDE INDUSTRIES B. V., Veghel (NL)

(72) Inventor: Jan Beewen, Siegen (DE)

(73) Assignee: VANDERLANDE INDUSTRIES B.V., Veghel (NL)

( * ) Notice: Subject to any disclaimer, the term of this patent is extended or adjusted under 35 U.S.C. 154(b) by 0 days.

(21) Appl. No.: 13/788,273

(22) Filed: Mar. 7, 2013

(65) Prior Publication Data

US 2013/0236278 A1  Sep. 12, 2013

(30) Foreign Application Priority Data

Mar. 9, 2012  (NL) ...................................... 2008454

(51) Int. Cl.
*B65G 65/00* (2006.01)
*B65G 1/04* (2006.01)

(52) U.S. Cl.
CPC .................................... *B65G 1/0492* (2013.01)

(58) Field of Classification Search
CPC ....................................................... B65G 1/00
USPC ......................................... 414/277, 278, 280
See application file for complete search history.

(56) References Cited

U.S. PATENT DOCUMENTS

| 8,088,203 B2 * | 1/2012 | Matsuba ......................... 96/417 |
| 2005/0069400 A1 * | 3/2005 | Dickey et al. ................. 414/277 |
| 2011/0013362 A1 * | 1/2011 | Merrow et al. ............... 361/695 |

FOREIGN PATENT DOCUMENTS

| DE | 3406974 | 9/1985 |
| EP | 2199229 | 6/2010 |

OTHER PUBLICATIONS

Search Report issued in application No. NL 2008454 (2012).

* cited by examiner

*Primary Examiner* — Saul Rodriguez
*Assistant Examiner* — Willie Berry, Jr.
(74) *Attorney, Agent, or Firm* — Barnes & Thornburg LLP; Mark J. Nahnsen

(57) ABSTRACT

The invention provides a trolley for use in a storage system comprising at least one row of side-by-side storage positions for containers, which trolley is reciprocally movable along a path of movement that extends parallel to the row for transferring a container between the trolley and a storage position located opposite the trolley. The trolley comprises a frame, at least one supporting arm and a device for moving the at least one supporting arm forward and backward, transversely to the path of movement, relative to the frame between a passive position and at least one active position, in which at least one active position, in contrast to the passive position, the at least one supporting arm extends at least partially into a storage position.

20 Claims, 5 Drawing Sheets

TROLLEY AS WELL AS A STORAGE SYSTEM COMPRISING SUCH A TROLLEY

CROSS REFERENCE TO RELATED APPLICATIONS

This application claims priority to Netherlands patent application no. 2008454, filed Mar. 9, 2012, the content of which is incorporated herein by reference in its entirety.

DESCRIPTION

The present invention provides a trolley for use in a storage system comprising at least one row of side-by-side storage positions for containers, which trolley is reciprocally movable along a path of movement that extends parallel to the row for transferring a container between the trolley and a storage position located opposite the trolley. Such a trolley is used in so-called automated storage and retrieval systems (AS/RS) either for transporting a product container to a storage position of a rack and placing it therein for temporary storage, or for removing a temporarily stored product container from such a storage position and transporting it to a picking station, for example, where products associated with an order are taken out of the product containers being supplied and collected in a collecting container for the order in question. Such trolleys, also referred to as shuttles, move in horizontal direction along a rack, more specifically, in the case of two adjacent racks, through the aisle between the racks in question, to which end rail systems for the trolleys are provided at different vertical levels. Using the lift which is generally provided at one end of the racks, as described in German publication DE 20 2010 015 962 U1, for example, shuttles can be moved from one vertical level to another vertical level. The trolley is provided with at least one extendable arm for transferring a container between a trolley and a storage position. Essentially two types can be distinguished in this regard. In the case of the first type, arms are provided with at least one stop member that can pivot forward and backward, by means of which a product container is engaged either at the front side so as to be pushed into a storage position, or at the rear side, with the arm extending along the product container, so as to be pulled from a storage position onto the trolley. In EP 647 575 A1 examples are shown of trolleys fitted with such an arm. In the case of the second type, the arm is used for supporting a product container, in which case the arm can be more specifically designated by the term supporting arm. By vertically moving the trolley with the supporting arm(s) in question in the extended position or while the supporting arms in question are being extended, it is possible to effect the transfer of a product container from the trolley to a transfer position (downward movement), where the product container comes to be supported on supporting elements that form part of each storage position, or to effect the transfer of a product container from a transfer position to a trolley (upward movement). The present invention relates to a trolley comprising at least one arm of the second type.

The object of the present invention is to provide a trolley as described in the introduction which has a relatively low cost price. This object is achieved in that the trolley according to the invention comprises a frame, at least one supporting arm and moving means for moving the at least one supporting arm forward and backward, transversely to the path of movement, relative to the frame between a passive position and at least one active position, in which at least one active position, in contrast to the passive position, the at least one supporting arm extends at least partially into a storage position, the moving means comprising a guide connected to the frame, at least one guide element connected to the at least one supporting arm and drive means for driving the reciprocal movement of the at least one supporting arm, during which movement the guide and the at least one guide element cooperate for guiding the at least one supporting arm along a guide path, wherein the guide path is inclined over at least part of its length, the inclination of the guide path being such that the at least one supporting arm takes up a higher position in the at least one active position than in the passive position. The use of a guide comprising a guide path thus inclined has the advantage that one drive motor can suffice for driving the extending movement and the retracting movement of the at least one supporting arm as well as the vertical movement of the at least one supporting arm. As a result, a trolley according to the invention can be of constructionally relatively simple design, which reduces the cost price.

A constructionally relatively simple embodiment of a trolley according to the invention can be obtained if the drive means comprise transmission means comprising at least one cam that is pivotable about a pivot pin, which cam is spaced from the pivot pin, and a camway in which said at least one cam moves upon pivoting of the cam, wherein the camway is rigidly connected to the at least one supporting arm and the pivot pin is rigidly connected to the frame. Pivoting of the cam results in horizontal movement of the camway and thus of the supporting arm(s) that is (are) rigidly connected to the camway.

In order to make the vertical movement of the supporting arm, and thus also of the camway, or at least of the element in which the camway is provided, possible in a simple manner during the movement of a supporting arm between the passive position and an active position, it is advantageous if the camway extends at least substantially vertically. Within the framework of this preferred embodiment it is not necessary, therefore, for the camway to extend exactly vertically, nor is it necessary for the camway to extend rectilinearly, although such variants are advantageous. The present preferred embodiment does not stand in the way of a supporting arm being selectively moved in two different directions from the passive position to an active position.

Preferably, the guide comprises a laterally extending groove, within which the guide element is accommodated. The supporting arm is thus retained in vertical direction.

If the trolley according to the invention is to be used in an aisle between two adjacent racks, it is very advantageous if the at least one supporting arm is movable from the passive position to two active positions, which two active positions are located on opposite sides of the passive position. The transfer of product containers between the trolley on the one hand and storage positions on either side of the aisle is thus possible.

The extent to which the at least one supporting arm must extend under a product container in order to have the transfer between the trolley and a transfer position take place in a reliable manner can be reduced if the at least one supporting arm comprises an arm frame which can move forward and backward in directions transversely to the path of movement of the trolley between the passive position and the at least one active position and an endless conveyor belt extending transversely to the path of movement, which can be driven relative to the arm frame.

The present invention also provides a storage system comprising at least one row of side-by-side storage positions for containers, wherein the storage system is provided with a trolley according to the invention as described in the foregoing, which trolley is reciprocally movable along a path of movement that extends parallel to said row for transferring a container between the trolley and a storage position located opposite the trolley. The advantages provided by such a storage system have already been discussed in the foregoing in the discussion of the trolley according to the invention.

In order to increase the efficiency with which the storage system can be operated, it is preferable if the system comprises at least two opposite, parallel rows of side-by-side storage positions for containers, wherein the path of movement extends between the two rows, and/or if the system comprises at least two superposed parallel rows of side-by-side storage positions for containers, wherein a path of movement is provided along each row, along which path of movement trolley is movable, and wherein the storage system further comprises a lift for moving a container in vertical direction.

The aforesaid vertical movement of the container can take place efficiently in particular if the lift is designed for moving a trolley in vertical direction, so that it is not necessary to remove the container from the trolley prior to being moved vertically by the lift.

To achieve a higher capacity of the storage system, the storage system preferably comprises a number of trolleys, for example at least one for each of the superposed rows of side-by-side storage positions, which will in practice also determine the maximum number of trolleys.

BRIEF DESCRIPTION OF THE DRAWINGS

The invention will now be explained in more detail by means of a description of a preferred embodiment of the invention, in which reference is made to the following associated FIGS. 1-4b.

Figure 1:
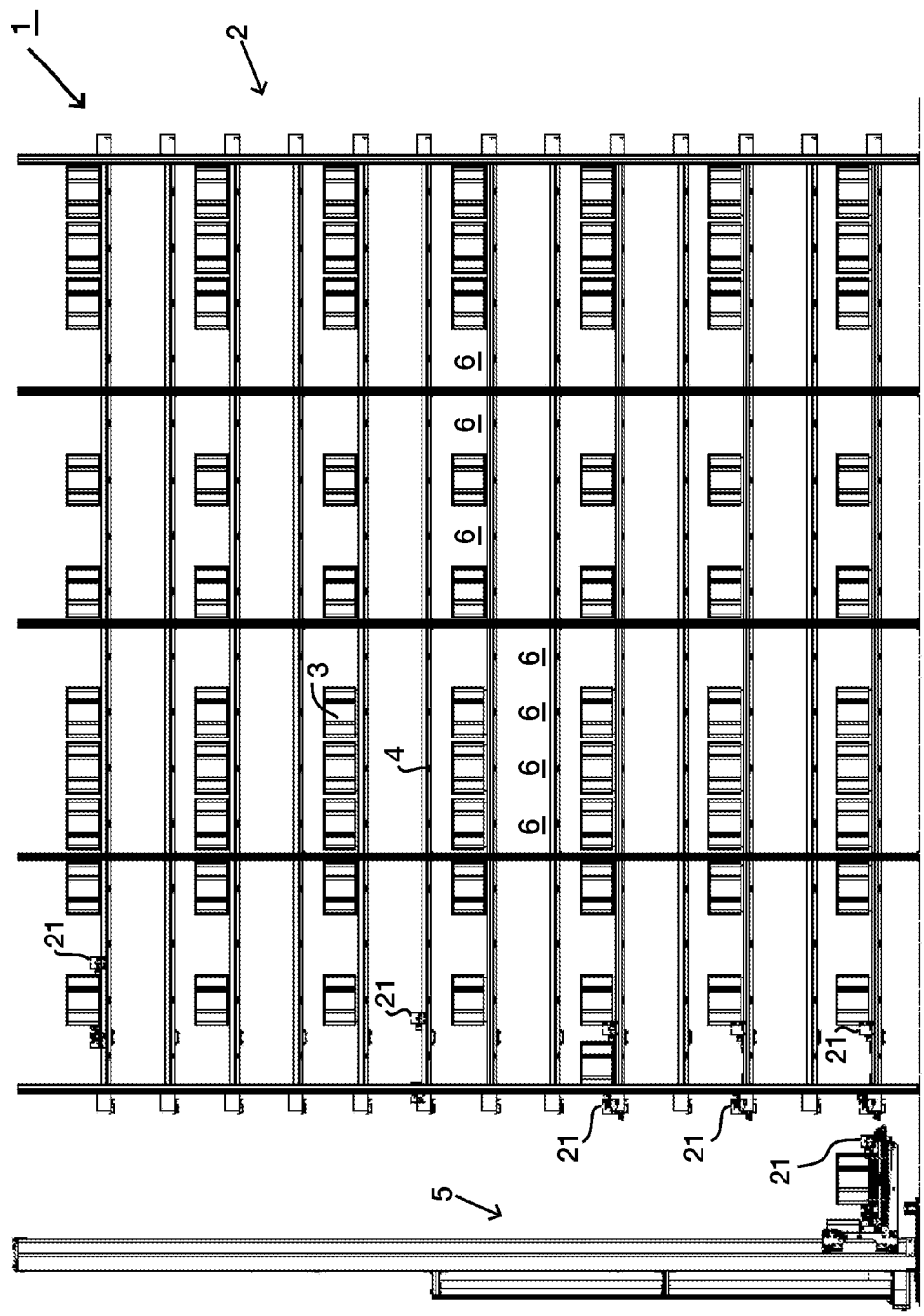
FIG. 1 is a side view of a storage system according to the invention as can be used in combination with a trolley according to the invention.

The storage system 1 comprises two adjacent racks, one of which is hidden from view by the other rack 2 in FIG. 1. Each of the racks has thirteen vertical levels. At each level, each rack is provided with a row of sixteen storage positions 6 arranged side by side. Each storage position is capable of storing one product container 3. To that end, each storage position is provided with support elements, such as sections, on which the bottom of the product container 3 rests.

Present between the two adjacent racks is an aisle. Horizontal rails 4 are provided at each of vertical level, along which rails a trolley 21 (yet to be discussed in more detail) can be moved according to a horizontal path of movement parallel to the plane of drawing. The rails 4 extend the entire length of the racks, so that each of the in total 32 storage positions on either side of the aisle can be reached by the trolley 21. In the present example, the storage system 1 comprises six trolleys 21. Five of said trolleys 21 are positioned on rails 4 for the first, the third, the fifth, the eighth and the thirteenth level, respectively. The sixth trolley is positioned on a lift 5, which is provided at the end of the aisle, onto which lift a trolley 21 can be moved from rails 4. By means of said lift 5, a trolley 21, on which a product container 3 may or may not be present, can be transported to one of the twelve other vertical levels.

Each trolley 21 has an at least substantially rectangular frame 23. At the corner points of the frame 23, the trolley 21 is provided with four running wheels 25 for moving the trolley 21 along the rails 4, at least one of which running wheels is driven by an on-board electric motor (not shown). Capacitor batteries 81 are provided on the trolley 21 for supplying energy to said electric motor and other electric motors (yet to be discussed). The trolley 21 comprises an antenna 82 for wireless exchange of information, such as control signals, for example, between a central control system and the various electric motors of the trolley 21.

Providing that they are positioned opposite a storage position 6, the trolleys 21 are each capable of placing a product container from the trolley 21 into the storage position 6 or of removing a product container 3 from the storage position 6 and placing it on the trolley. To enable such a transfer of product containers 3, each trolley 21 comprises two parallel supporting arms 22, which can be moved in two directions relative to the frame 23 of the trolley from the passive position shown in FIG. 2 to an active position as indicated by the arrows 24. Each of the supporting arms 22 comprises an arm frame 26 provided with pulleys 27 rotatably mounted on the ends thereof. A narrow conveyor belt 28 is passed over each pair of pulleys 27 associated with an arm frame 26. The arm frames 26 of a trolley 21 are rigidly interconnected via cross beams 29, so that the supporting arms 22 of each trolley 21 can only extend and retract simultaneously. Two opposite pulleys 27 of two supporting arms 22 are interconnected via a connecting shaft 30. Connected to one of the two arm frames 26 is a drive unit comprising an electric motor 31 and a transmission 32, by means of which the connecting shaft 30, and thus the running wheels interconnected via the connecting shaft 30, and thus the associated conveyor belts 28, can be driven. Guides 83 are provided on the outer sides of the arm frames, just above said arm frames, for guiding a product container 3.

Figure 2:
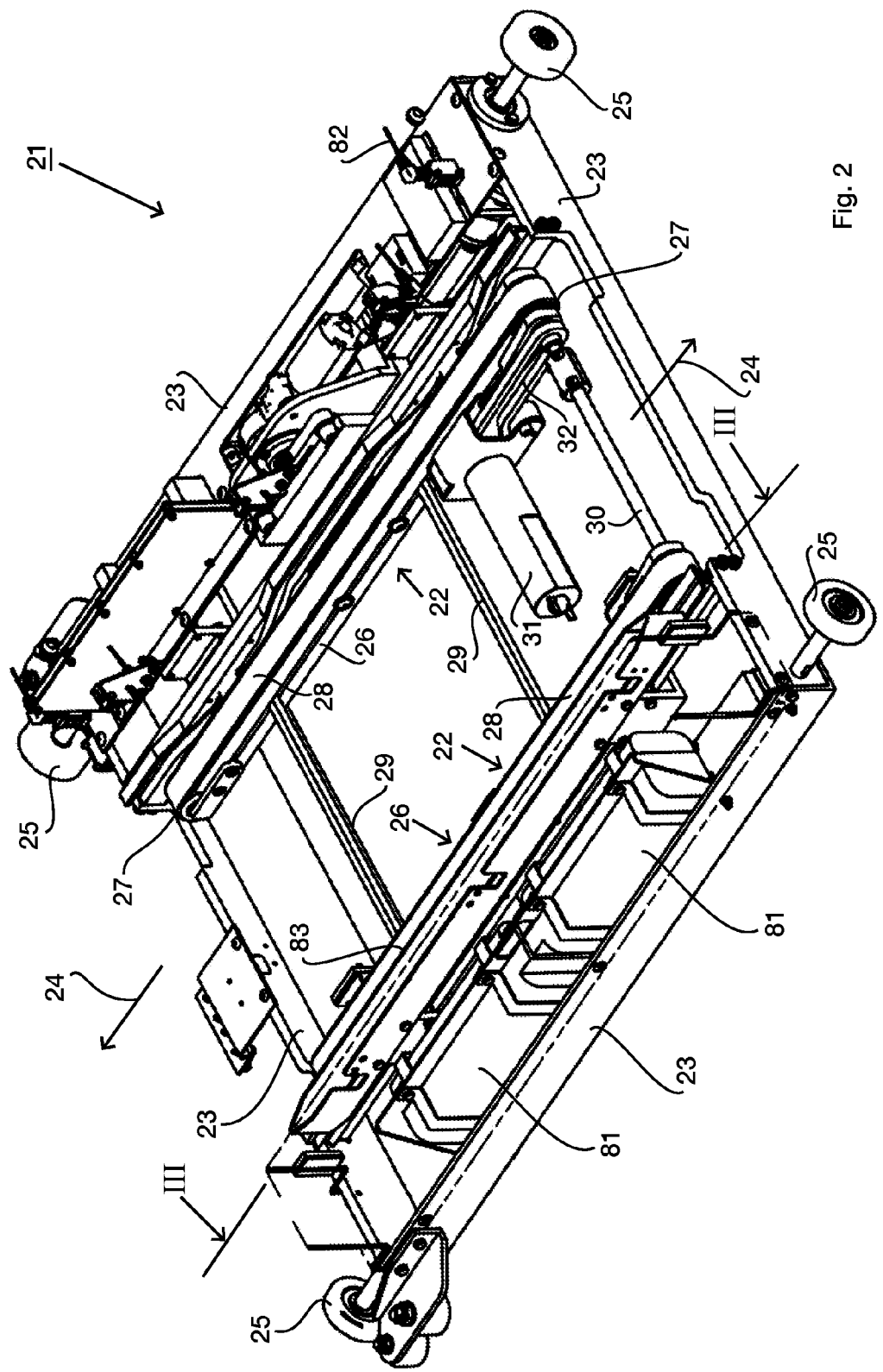
FIG. 2 is an isometric view of a trolley according to the invention, from which a few parts have been omitted for the sake of clarity.
Figure 3:
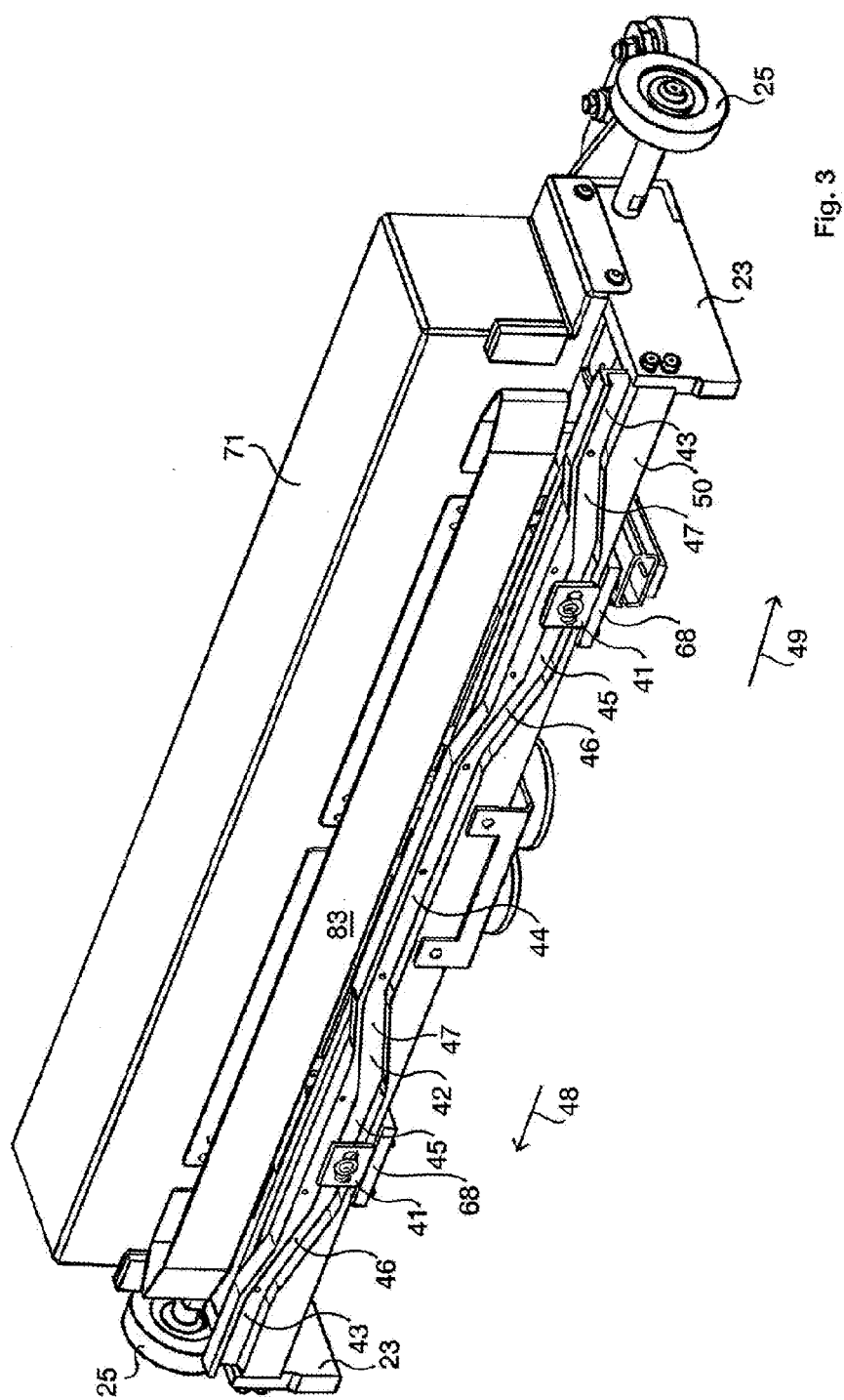
FIG. 3 is a vertical sectional view along the line III-III in FIG. 2.
Figure 4A:
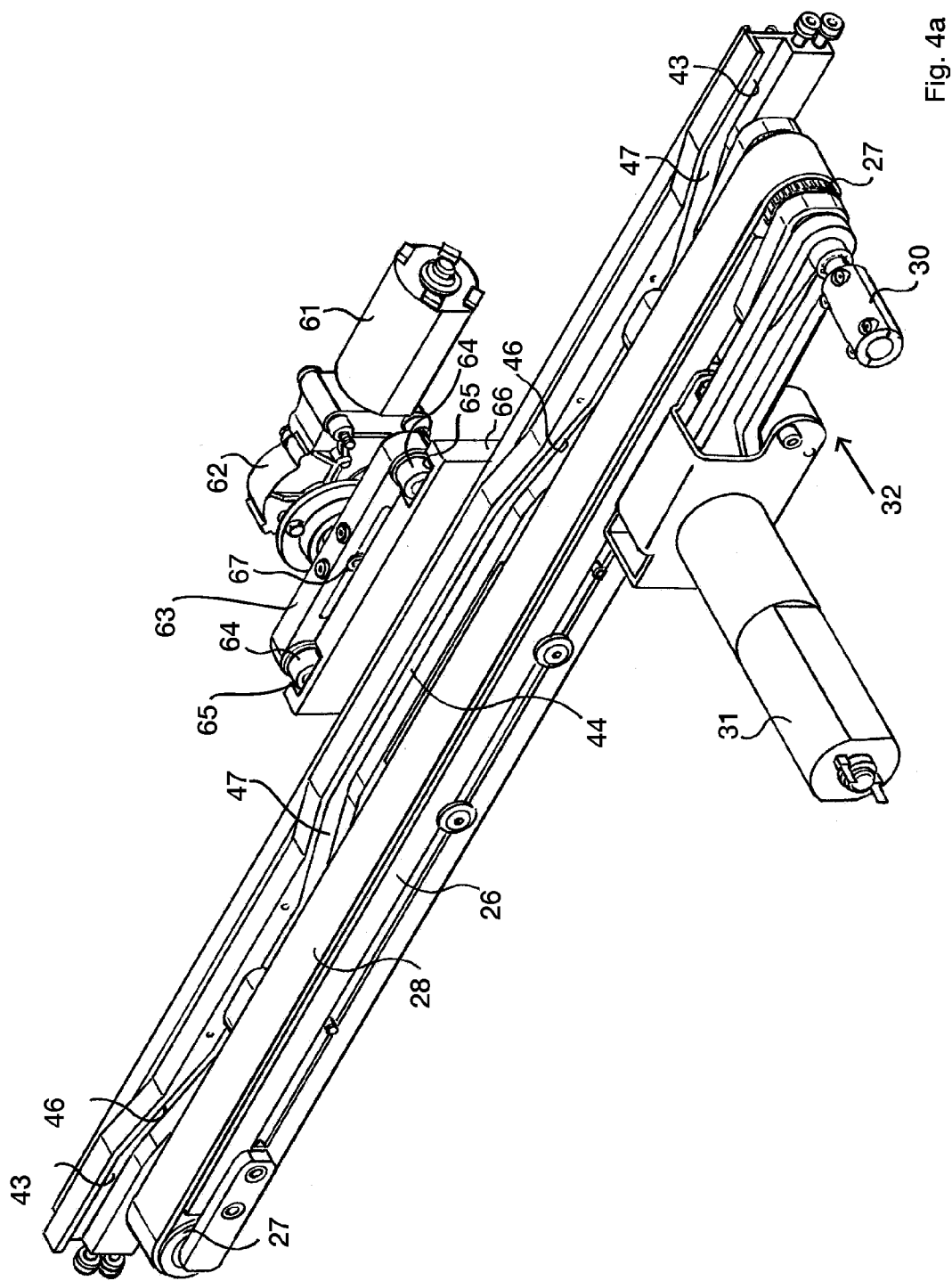
FIGS. 4a and 4b are isometric views of a supporting arm, in the passive position and in an active position, respectively, and of the drive means for the supporting arm and the direct vicinity thereof.

In the sectional view of FIG. 3, two connecting plates 41 can be distinguished, which plates are rigidly connected to an arm frame 22 on one side and provided with a guide roller on the other side. Said guide rollers are accommodated within a guideway configured as a laterally extending groove 42 formed in a guide body 50. The guide body 50 is rigidly connected to the frame 23. The groove 42 defines a guide path that follows the corrugated shape of the groove. Said corrugated shape is defined by two outer raised parts 43, a central raised part 44 and a lowered part 45 between the respective raised parts 43 and 44. Said raised and lowered parts 43-45 are interconnected via inclined parts 46, 47. In FIG. 3, the guide rollers are positioned in the lowered parts 45, and as a result the supporting arms 22 are in the passive, low position as also shown in FIGS. 2 and 4a. By moving the guide rollers from the passive position in one of the directions 48, 49 relative to the frame 23, in a manner yet to be explained, until the guide rollers are positioned in the raised parts 43, 44, the supporting arms 22 will not only extend in horizontal direction but also undergo a vertical upward movement during said extension, thereby assuming an active position.

Extending the supporting arms 22 from the passive position to an active position can take place in order to move a product container 3 supported on the supporting arms 22 into a storage position 6. In the active position, the supporting arms only extend partially into the storage position 6. In said active position, the supporting arms 22 keep the product container 3 just above the level of the supporting elements that form part of the storage position 6. Subsequently the product container is moved further into the storage position by suitably energizing of the electric motor 31 temporarily. As soon as the centre of gravity of the product container 3 passes the ends of the supporting arms 22, the product container 3 will tilt downward onto the supporting elements. Once the product container is entirely accommodated in the storage position, the electric motor 31 will stop and the supporting arms 22 will return from the active position to the passive position, during which movement the guide rollers will take up the positions shown in FIG. 3 again and as a consequence of this the supporting arms will make not only a horizontal movement but also a vertical downward movement. As a result, the product container 3 comes to be entirely supported on the supporting elements of the storage position 6.

Extending the supporting arms 22 from the passive position to an active position can also take place in order to remove a product container 3 that is supported on the supporting elements of a storage position 6 from said storage position. During the extending movement of the supporting arms 22, said supporting arms will lift the product container 3 from the supporting elements at least on one side. As soon as the supporting arms 22 have assumed the active position, the electric motor 31 will be energized, as a result of which the entire product container 3 will be moved onto the supporting arms 22 as a result of friction between the conveyor belts 28 and the product container 3. Subsequently, the supporting arms 22 will return from the active position to the passive position again.

Figure 4B:
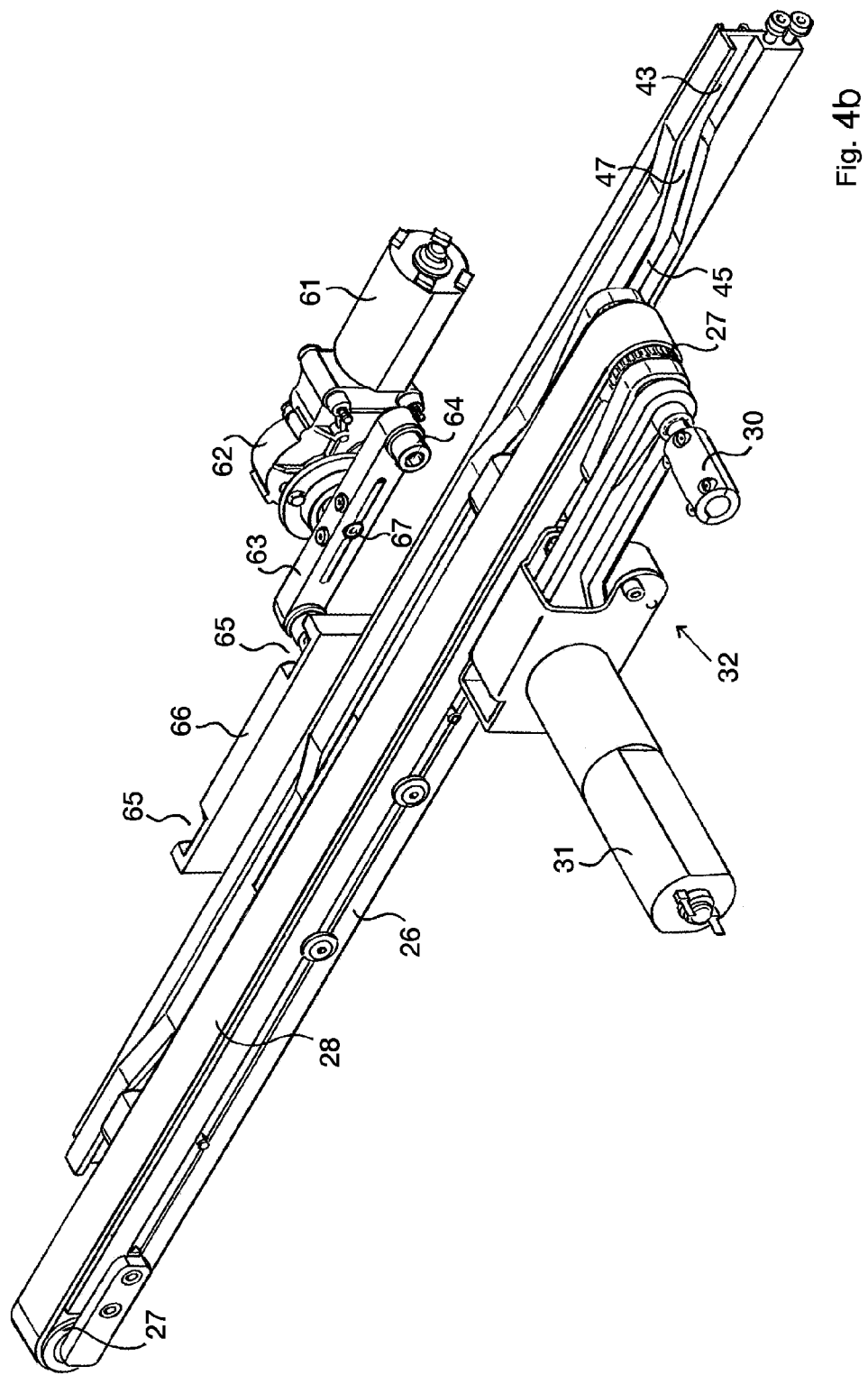

FIGS. 4a and 4b show in more detail the means of the trolley 21 that are relevant for moving the supporting arms 22 between the passive position and an active position. The trolley 21 to that end comprises a second electric motor 61, which pivotally drives an arm 63 about a pivot pin 67 via a right-angled transmission 62. Provided at the ends of the arm 63 are two cams 64, which, at least in the passive position shown in FIG. 4a, are accommodated in respective vertically extending camways 65. The camways 65 are provided in a cam plate 66. The electric motor 61 and the transmission 62 are rigidly connected to the frame 23. Elements 61-67 as discussed before are accommodated in a housing 71 (FIG. 3). The cam plate 66 is rigidly connected to an arm frame 26 via connecting means, of which only bracket parts 68 and connecting plates 41 are shown in FIG. 3. The supporting arms 22 will therefore follow the horizontal movement of the cam plate 66, whilst on account of the upright nature of the camways 65 the cam plate 66 can also follow the vertical movement of the supporting arms 22 forced upon said arms by the guideway 42 during horizontal movement of the supporting arms. Pivoting of the arm 63 through 180 degrees from the passive position shown in FIG. 4a by suitable energization of the electric motor 61 will cause the supporting arms 22 to extend to an active position (FIG. 4b). Upon said extension, one of the cams 64 will move clear of the associated camway 65, whilst the other cam 64, on the contrary, will move within the associated camway 65, causing the cam plate 66 to move in horizontal direction. As a result, the supporting arms 22 will also be positioned at a higher level, viz. higher by as much as the raised parts 43, 44 are positioned higher than the lowered parts 45. The skilled person will appreciate that pivoting of the arm 63 through 180 degrees from the passive position shown in FIG. 4a in the opposite direction will cause the supporting arms 22 to extend in the opposite direction to the other active position, with the other cam 64 moving in the other camway 65. This achieves that a single electric motor 61 can selectively drive the supporting arms in two opposite horizontal directions, which horizontal movement of the supporting arms 22 goes hand in hand with vertical movement of the supporting arms 22.

The invention claimed is:

1. A trolley for use in a storage system comprising at least one row of side-by-side storage positions for containers, which trolley is reciprocally movable along a path of movement that extends parallel to the row for transferring a container between the trolley and a storage position located opposite the trolley, the trolley comprising a frame, at least one supporting arm and moving means for moving the at least one supporting arm forward and backward, transversely to the path of movement, relative to the frame between a passive position and at least one active position, in which at least one active position, in contrast to the passive position, the at least one supporting arm extends at least partially into a storage position, the moving means comprising a guide connected to the frame, at least one guide element connected to the at least one supporting arm and drive means for driving the reciprocal movement of the at least one supporting arm, during which movement the guide and the at least one guide element cooperate for guiding the at least one supporting arm along a guide path, wherein the guide path is inclined over at least part of its length, the inclination of the guide path being such that the at least one supporting arm takes up a higher position in the at least one active position than in the passive position, and wherein the drive means comprise transmission means comprising at least one cam that is pivotable about a pivot pin, which cam is spaced from the pivot pin, and a camway in which said at least one cam moves upon pivoting of the cam, wherein the camway is rigidly connected to the at least one supporting arm and the pivot pin is rigidly connected to the frame.

2. A trolley according to claim 1, wherein the camway extends at least substantially vertically.

3. A trolley according to claim 1, wherein the guide comprises a laterally extending groove, within which the guide element is accommodated.

4. A trolley according to claim 1, wherein the at least one supporting arm is movable from the passive position to two active positions, which two active positions are located on opposite sides of the passive position.

5. A trolley according to claim 1, wherein the at least one supporting arm comprises an arm frame which can move forward and backward in directions transversely to the path of movement of the trolley between the passive position and the at least one active position and an endless conveyor belt extending transversely to the path of movement, which can be driven relative to the arm frame.

6. A storage system comprising at least one row of storage positions arranged side by side, wherein the storage system comprises a trolley according to claim 1, which trolley is reciprocally movable along a path of movement that extends parallel to the row for transferring a container between the trolley and a storage position located opposite the trolley.

7. A storage system according to claim 6, wherein the system comprises at least two opposite, parallel rows of side-by-side storage positions for containers, wherein the path of movement extends between the two rows.

8. A storage system according to claim 6, wherein the system comprises at least two superposed parallel rows of side-by-side storage positions for containers, wherein a path of movement is provided along each row, along which path of movement trolley is movable, and wherein the storage system further comprises a lift for moving a container in vertical direction.

9. A storage system according to claim 8, wherein the lift is designed for moving a trolley in vertical direction.

10. A storage system according to claim 6, wherein the storage system comprises a number of trolleys.

11. A storage system according to claim 10, wherein the storage system comprises a trolley for each of the superposed rows of side-by-side storage positions.

12. A trolley for use in a storage system comprising at least one row of side-by-side storage positions for containers, which trolley is reciprocally movable along a path of movement that extends parallel to the row for transferring a container between the trolley and a storage position located adjacent the trolley, the trolley comprising:
 a frame,
 at least one supporting arm, and
 moving means for moving the at least one supporting arm transversely to the path of movement of the trolley and relative to the frame between a passive position and at least one active position in which the at least one supporting arm extends at least partially into one of the storage positions of the row of storage positions, the moving means comprising:
 a guide body connected to the frame and formed to include a guide path,
 at least one guide element connected to the at least one supporting arm and extending into the guide path of the guide body, and
 drive means coupled to the at least one supporting arm for driving the reciprocal movement of the at least one supporting arm, during which movement the guide body and the at least one guide element cooperate for guiding the at least one supporting arm along the guide path,
 wherein the guide path is inclined over at least part of its length, the inclination of the guide path being such that the at least one supporting arm takes up a relatively higher position in the at least one active position than in the passive position,
 wherein the drive means includes at least one cam that is spaced apart from and pivotable about a pivot pin coupled to the frame, and a cam plate coupled to the at least one supporting arm and formed to include at least one camway in which the at least one cam moves upon pivoting of the cam about the pivot pin.

13. The trolley of claim 12, wherein the camway extends in a substantially vertical direction.

14. The trolley of claim 12, wherein the guide path comprises a laterally extending groove formed in the guide body.

15. The trolley of claim 14, wherein the at least one supporting arm is movable from the passive position to two active positions located on opposite sides of the passive position.

16. The trolley of claim 15, wherein the at least one cam comprises two cams positioned on opposing sides of the pivot pin, wherein the cam plate is formed to include two camways, each camway associated with one of the cams respectively, and wherein movement of the at least one supporting arm to one of the active positions is accomplished with the cam positioned opposite of the pivot pin from a direction of travel to the active position when the supporting arm is in the passive position.

17. The trolley of claim 16, wherein the at least one supporting arm comprises two supporting arms simultaneously movable between the passive position and two active positions.

18. The trolley of claim 15, wherein the at least one supporting arm includes an arm frame and an endless conveyor belt extending transversely to the path of movement of the trolley which can be driven relative to the arm frame.

19. The trolley of claim 18, wherein the endless conveyor belts of the two supporting arms are simultaneously movable relative to the arm frames.

20. A trolley for use in a storage system comprising at least one row of side-by-side storage positions for containers, which trolley is reciprocally movable along a path of movement that extends parallel to the row for transferring a container between the trolley and a storage position located adjacent the trolley, the trolley comprising:
 a frame,
 at least one supporting arm, and
 moving means for moving the at least one supporting arm transversely to the path of movement of the trolley and relative to the frame between a passive position and at least one active position in which the at least one supporting arm extends at least partially into one of the storage positions of the row of storage positions, the moving means comprising:
 a guide connected to the frame,
 at least one guide element connected to the at least one supporting arm, and
 drive means for driving the reciprocal movement of the at least one supporting arm, during which movement the guide and the at least one guide element cooperate for guiding the at least one supporting arm along a guide path, the drive means including:
 at least one cam that is pivotable about a pivot pin and spaced from the pivot pin, and
 a camway in which said at least one cam moves upon pivoting of the cam, the camway being coupled to the at least one supporting arm and the pivot pin being coupled to the frame for rotation relative thereto,
 wherein the guide path is inclined over at least part of its length, the inclination of the guide path being such that the at least one supporting arm takes up a relatively higher position in the at least one active position than in the passive position.

* * * * *